(12) United States Patent
Bokusky et al.

(10) Patent No.: US 7,477,028 B2
(45) Date of Patent: Jan. 13, 2009

(54) ACTUATOR CONTROL SYSTEM

(75) Inventors: Mark D. Bokusky, Brooklyn Park, MN (US); Cory L. Grabinger, Maple Grove, MN (US); Emily R. Vinella, Watertown, SD (US)

(73) Assignee: Honeywell International Inc., Morristown, NJ (US)

( * ) Notice: Subject to any disclaimer, the term of this patent is extended or adjusted under 35 U.S.C. 154(b) by 7 days.

(21) Appl. No.: 11/557,253

(22) Filed: Nov. 7, 2006

(65) Prior Publication Data

US 2007/0176758 A1 Aug. 2, 2007

Related U.S. Application Data

(63) Continuation-in-part of application No. 11/275,814, filed on Jan. 30, 2006.

(51) Int. Cl.
*H02P 1/00* (2006.01)
(52) U.S. Cl. ............ 318/273; 318/696; 318/432; 318/433
(58) Field of Classification Search ........ 318/273, 318/696, 432, 433, 434, 611, 635, 782, 278; 388/903; 340/664
See application file for complete search history.

(56) References Cited

U.S. PATENT DOCUMENTS

| | | | |
|---|---|---|---|
| 4,157,506 A | 6/1979 | Spencer | |
| 4,695,246 A | 9/1987 | Beilfuss et al. | |
| 4,842,510 A | 6/1989 | Grunden et al. | |
| 4,872,828 A | 10/1989 | Mierzwinski | |
| 4,955,806 A | 9/1990 | Grunden et al. | |
| 5,158,447 A | 10/1992 | Geary | |
| 5,175,439 A | 12/1992 | Harer et al. | |
| 5,255,179 A | 10/1993 | Zekan et al. | |
| 5,347,982 A | 9/1994 | Binzer et al. | |
| 5,506,569 A | 4/1996 | Rowlette | |
| 6,060,719 A | 5/2000 | DiTucci et al. | |
| 6,084,518 A | 7/2000 | Jamieson | |
| 6,222,719 B1 | 4/2001 | Kadah | |
| 6,509,838 B1 | 1/2003 | Payne et al. | |
| 6,743,010 B2 | 6/2004 | Bridgeman et al. | |
| 6,794,771 B2 | 9/2004 | Orloff | |
| 2003/0064335 A1 | 4/2003 | Canon | |
| 2004/0209209 A1 | 10/2004 | Chodacki et al. | |
| 2005/0093708 A1* | 5/2005 | Dupeire | 340/664 |
| 2005/0156545 A1* | 7/2005 | Mueller et al. | 318/273 |

OTHER PUBLICATIONS

Honeywell, "S4965 Series Combined Valve and Boiler Control Systems," 16 pages, prior to the filing date of present application.
Honeywell, "SV9410/SV9420; SV9510/SV9520; SV9610/SV9620 SmartValve System Controls," Installation Instructions, 16 pages, 2003.

* cited by examiner

*Primary Examiner*—Karen Masih

(57) ABSTRACT

A system for maintaining appropriate control of an actuator in the event of a power disruption without being adversely affected by the period of the power disruption. The actuator may close during the power disruption but will be fully opened upon the return of power to the system. After being opened, the actuator may be kept open with less power than needed for opening it.

19 Claims, 14 Drawing Sheets

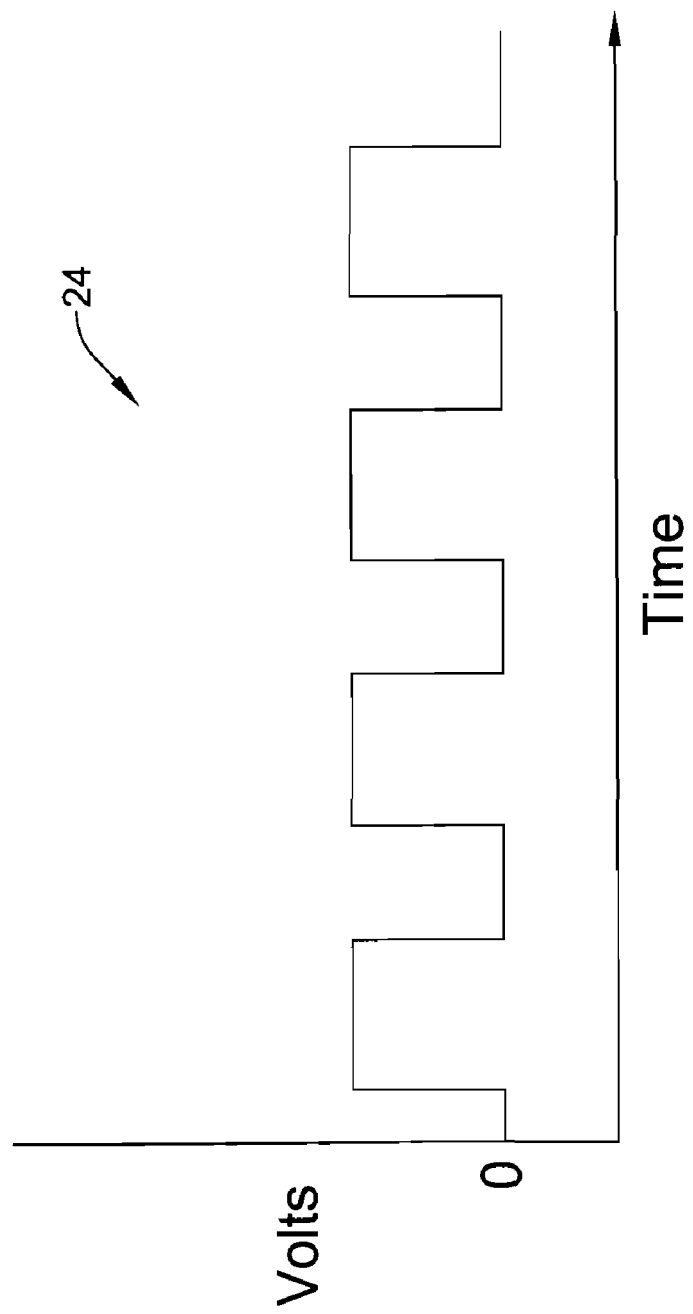

| R | S | Q | MODE |
|---|---|---|------|
| 1 | 0 | 0 | DRIVE* |
| 0 | 0 | Q | DRIVE |
| 0 | 1 | 1 | HOLD |
| 1 | 1 | 0 | DRIVE |

Q=Q'=0  *START-UP

*Figure 4*

ACTUATOR CONTROL SYSTEM

The present application is a continuation-in-part of U.S. patent application Ser. No. 11/275,814, filed Jan. 30, 2006. U.S. patent application Ser. No. 11/275,814, filed Jan. 30, 2006, is hereby incorporated by reference.

BACKGROUND

The present invention pertains to actuators for heating, ventilation and air conditioning systems, and particularly to actuator controls.

SUMMARY

The invention is a system for maintaining desired actuator control in the event of a power disruption despite the amount of the duration of the disruption, and in the event of slow voltage rise.

BRIEF DESCRIPTION OF THE DRAWING

FIGS. 3a and 3b are graphs of drive signals to an actuator;

FIG. 4 is a truth table of the latch;

DESCRIPTION

Figure 1:
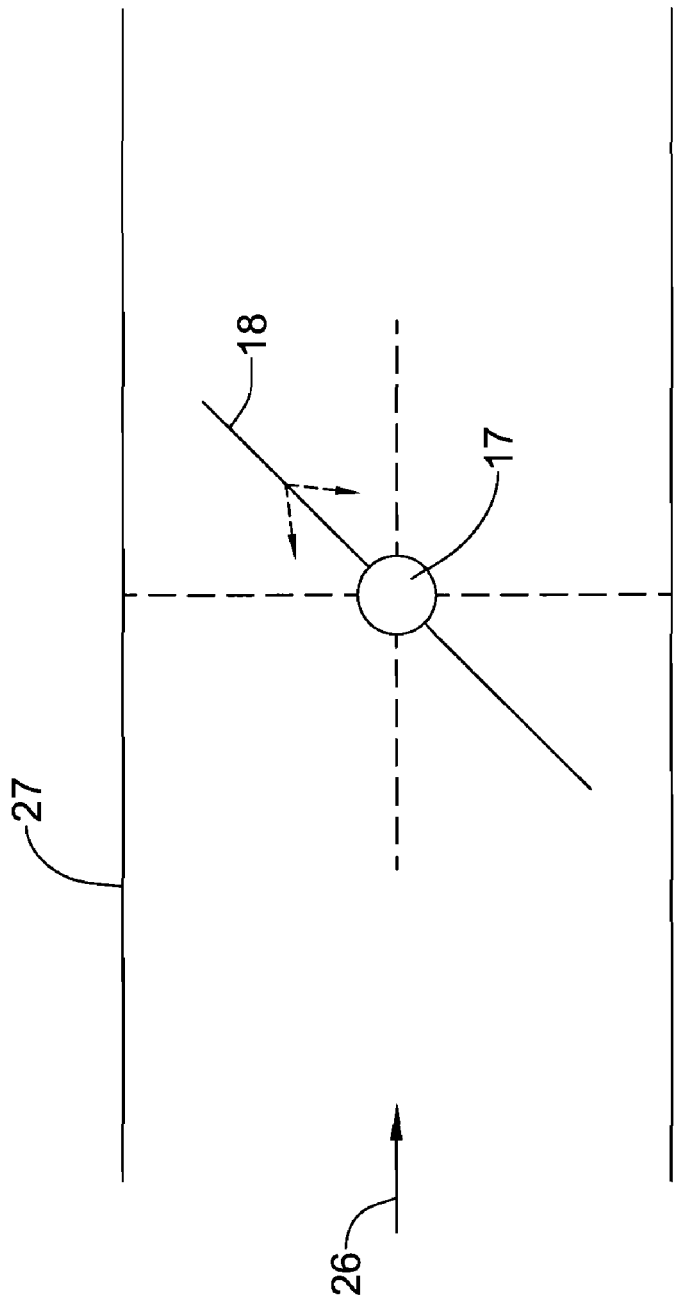
FIG. 1 is a diagram of a damper with an actuator which a latch and related circuitry may control.

An item of concern is the control of a smoke and fire actuator 17 (FIG. 1) connected to, for an illustrative example, to a damper 18 (actuable mechanism) of an HVAC (heating, ventilation and air conditioning) system of a building. The actuator 17 may have two different modes, run (i.e., drive) and hold. Actuator 17 may be regarded as, for instance, a motor, solenoid, and the like, and be connected with a mechanical linkage 60 (FIG. 2) to the damper 18 in a vent 27 of the HVAC system for flow 26 control. Here, an instance of the actuator 17 may be a motor. The terms "actuator" and "motor" may be used herein interchangeably.

Figure 2:
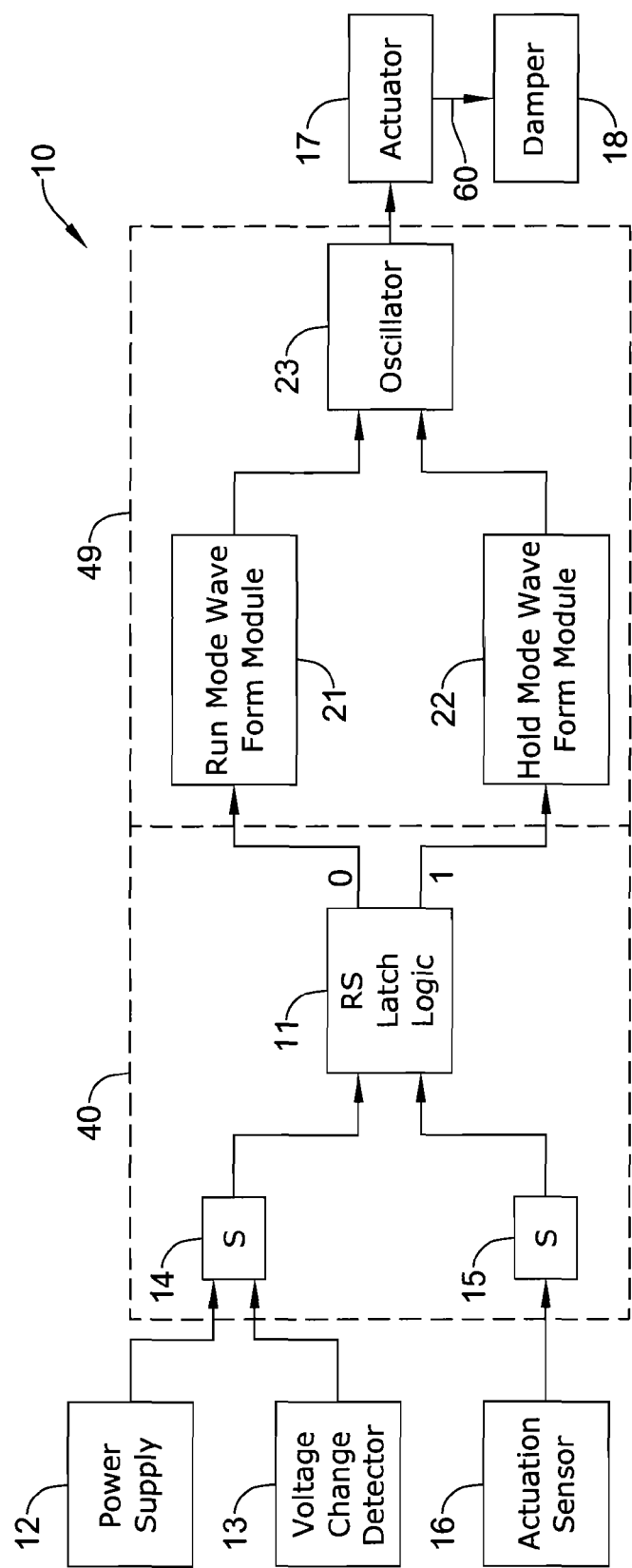
FIG. 2 is a block diagram of the latch and related circuitry.

FIG. 2 is a block diagram of the present system 10 incorporating an RS latch integrated AC detect reset and slow voltage rise compensating mechanisms having an application to actuators. The system is for maintaining desired actuator control in the event of a power disruption despite the amount of the duration of the disruption, and in the event of slow voltage rise. The blocks or modules and their interconnections in FIG. 2 are illustrated in the other Figures discussed herein. There may be a slow voltage rise (voltage change) detector 13 and a power supply 12 having an indicator tied in with ultimately an R input 14 of an RS latch logic device 11 (NOR gates 41 and 42 of latch mechanism 40 in FIG. 6). There is an actuation sensor 16, which may include a Hall sensor 52 (FIG. 8), for indicating movement of the motor or actuator 17, connected to the S input 14 of latch 11. The actuator 17 may be mechanically linked via connection 60 to the damper 18. The actuator 17 or damper 18 may be spring loaded to close the damper when there is no other force acting on the damper, such as that of the actuator 17 operating to open it or hold it open.

The actuator 17 may be operated with a pulse width modulated (PWM) or varied pulse width electrical power drive signal. An example actuator 17 may be a motor. The motor may be a brushed D.C. type of device. During a run or drive mode, the actuator or motor 17 may be fed a high duty ratio (i.e., a large pulse width) drive signal to open the damper 18. During the hold mode, the motor 17 may be fed a low duty ratio (i.e., a small pulse width) drive signal which needs to be only sufficient to hold the damper 18 in its position against the tension of, for instance, an actuator spring acting to close the damper. The low duty ratio signal may be used to conserve energy, and to lengthen the life of the actuator 17 by eliminating excessive stress on it.

Figure 3B:
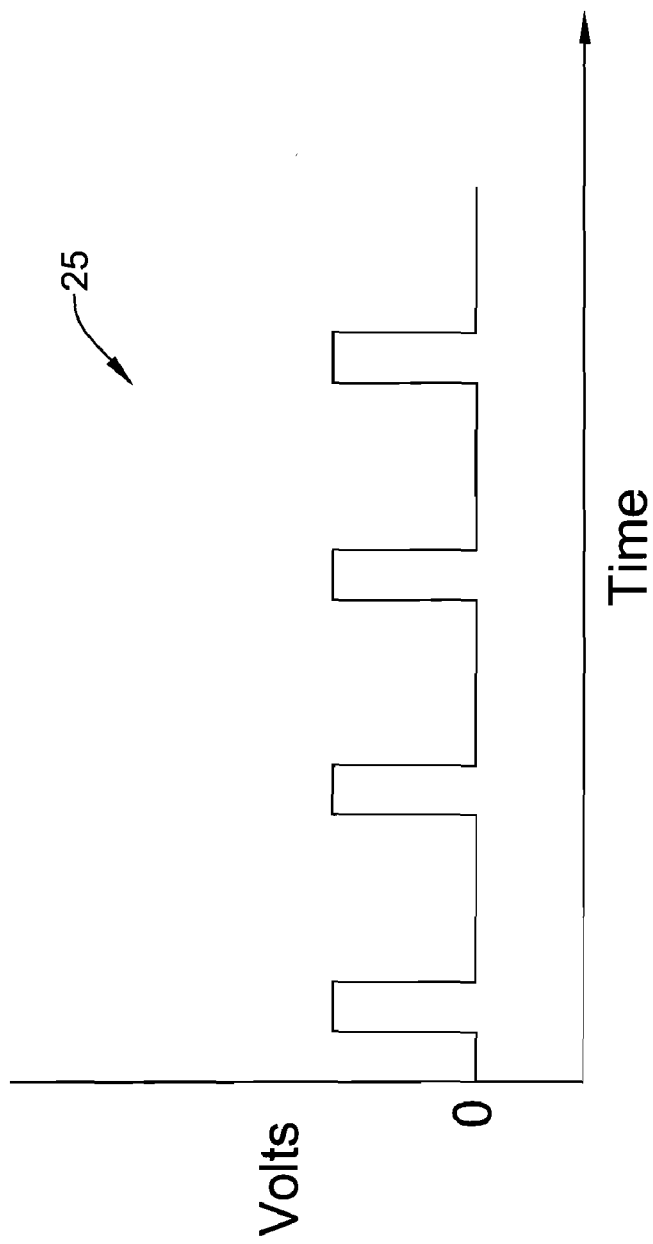

The output of the logic device 11 may be a logic 1 or a logic 0. The logic 0 is a signal for a run mode pulse width waveform module 21 for a driver or oscillator 23 to provide the respective run signal to the motor or actuator 17. The logic 1 is a signal for a hold mode pulse width waveform module 22 for oscillator 23 to provide the respective hold drive signal to the motor or actuator 17. Modules 21 and 22, and oscillator 23 may constitute oscillator module 49. The output of the module 21 may select a 60 percent duty cycle of a signal 24 and the output of the module 22 may select a 20 percent duty cycle of a signal 25, as shown in FIGS. 3a and 3b, respectively. These are examples since the duty cycles may be of other percentages. A run drive signal may be defined as having a duty cycle greater than about forty percent and a hold drive signal may be defined as having a duty cycle less than about forty percent. The frequency of signals 24 and 25 may be about 20 KHz or another value.

The module 21 may output the run mode signal to the oscillator 23, which in turn can output a 60 percent or so duty cycle drive signal to the actuator 17. Actuator 17 may rotate the damper 18, if closed, about 90 degrees for a full open position. Then a signal from the actuation sensor 16, which senses actuator 17 motion, may indicate that the actuator 17 has stopped. Then a signal, indicating no motion of the actuator 17, may go to the S input 15 of the RS latch logic device 11. Device 11 may output a logic 1 signal indicating a hold to module 22 which indicates oscillator 23 to provide the 20 or so percent duty cycle drive signal to the actuator 17. This drive signal may provide just enough amount of signal to the actuator 17 to hold the damper 18 open. The weaker 20 percent duty cycle drive signal to the actuator 17 may be provided in lieu of the 60 percent duty cycle drive signal to avoid unneeded stress on the actuator, to extend the life of the motor or actuator, and to save power.

If power is lost to an overall system of which the actuator and damper are a part, then the damper 18 will close because of no hold or drive signal being provided to the actuator 17. The actuator 17 or damper 18 may have a spring-loaded tension applied to the damper 18 to cause the damper to close and remain closed when no drive signals are applied to the actuator 17. This characteristic is for safety reasons, among other reasons, such as, for example in the event of a fire, to prevent movement of smoke along with air 26 (FIG. 1) in the vent passages 27 to various spaces of the building, including those spaces with personnel still in them.

Figure 5:
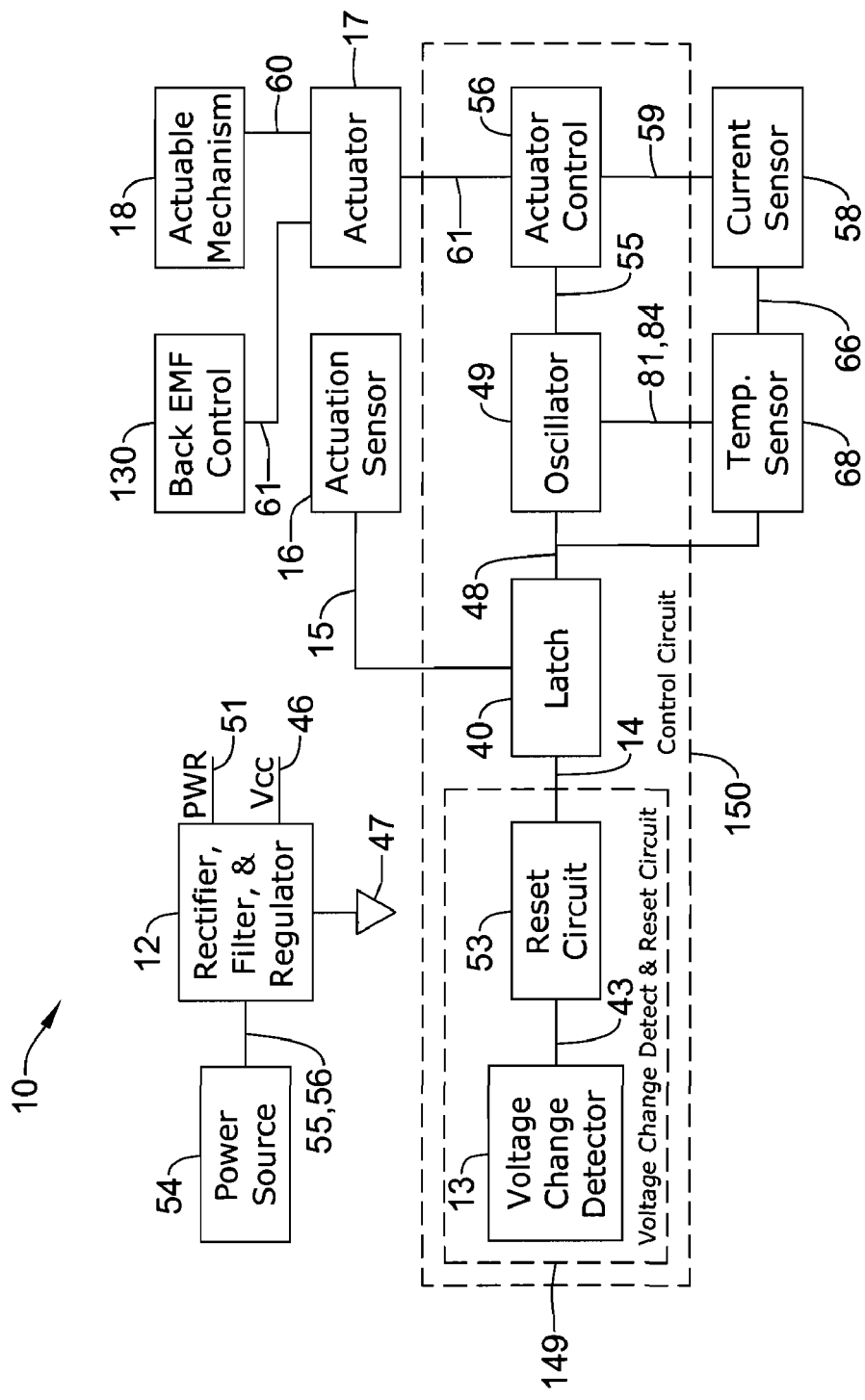
FIG. 5 is a block diagram of the latch and actuator arrangement.

FIG. 5 is a block diagram of components of the system 10 incorporating the present invention. The components and their interconnections are described herein. The Figure shows an overview of a circuit 150 which may include a voltage change detector, slow voltage rise detector or AC detect circuit 13, a reset circuit 53, a latch 40, a driver or oscillator 49 and an actuator control module 56. Circuits 13 and 53 may be quite integrated with overlap having an appearance of one circuit in some implementing designs. Circuits 13 and 53 may be regarded as a detect and reset circuit 149.

Figure 6:
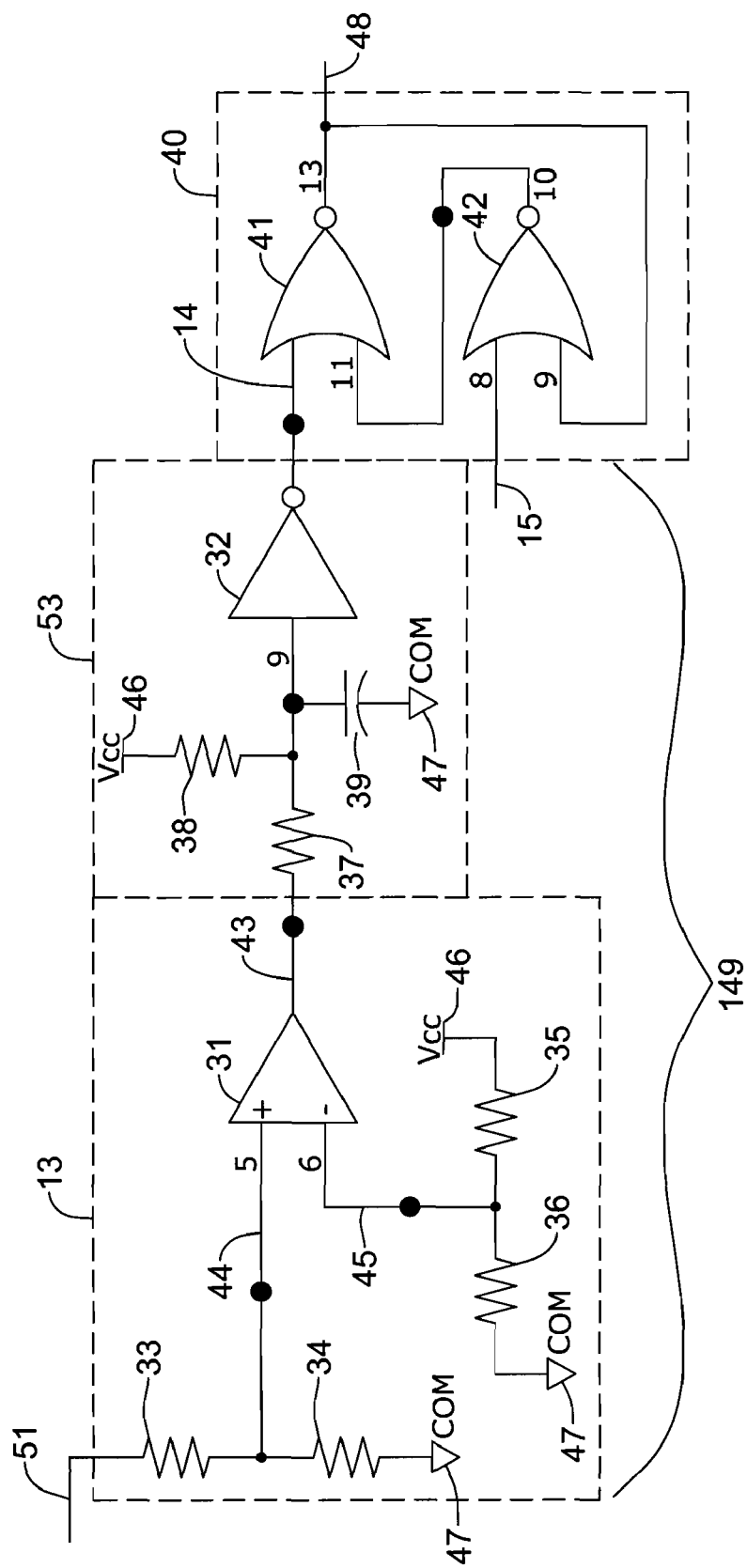
FIG. 6 is a schematic of a slow voltage rise detector, reset device and latch logic.

The present circuit may have an RS latch 40 as shown in FIGS. 1 and 6. This latch is to prevent actuator 17 from going back into a run mode after stalling, thus preventing oscillation.

An issue is that, when power is taken away, energy has to dissipate from the circuit before the latch 40 can be reset properly and the actuator 17 can return to the run mode so as to drive the damper 18 back open. If power is removed from the actuator 17 after it has reached a hold mode and then is powered shortly after (within 2 seconds), the actuator will return to the hold mode. During the power-off time, the actuator 17 spring returns a short distance of a stroke to put the damper 18 in a partially closed position. Since the actuator 17 comes back into the hold mode, the damper 18 may remain in the partially closed position. Such successive power interruptions will cause the actuator 17 to eventually let the damper 18 close all the way. This action may be a major issue in the field because when customers test their backup power generators, they may remove power from the actuator system for about one second or less. However, the related art actuator literature for this configuration appears to say to remove power for more than two seconds to reset the actuator properly. The present system 10 may have the actuator reset virtually immediately after removing power and to remove this power removal duration requirement.

Another issue is when voltage to the actuator 17 rises slowly, the actuator may enter the hold mode before it is able to drive open the damper 18 and thus the damper remains closed. This can be a significant cause of customer complaints in the field relating to normal behavior of the actuator 17. The invention is a system for solving these issues so that the actuator and damper arrangement of this configuration can compete better in the field and keep customers satisfied. Upon a return of power, the present system 10 permits the actuator 17 to open the damper 18 before the actuator enters the hold mode. Also, the period of time between the moment of detecting a loss of power in the system 10 and a moment of detecting a return of power in the system may range from about a millisecond to greater than five minutes, while still permitting system to operate appropriately as indicated herein.

The present system may begin to solve the latch 40 reset problem by detecting a loss in AC, if the primary source of power, or DC if not, which occurs upon a power loss to the system. Upon the loss of power, an AC-detect or voltage change circuit 13 may reset the RS latch 40 before the energy is dissipated from the system circuit, which puts the actuator 17 back into the run mode. Energy during a dissipation period after the power loss for circuit operation may be provided by a large capacitor (e.g., capacitor 109 of FIG. 11) across the system circuit power supply terminals. The actuator 17 in the run mode may provide the correct initial condition for the circuit when power is restored whether there is still electrical energy or not in the circuit. The slow voltage rise problem may be solved by keeping the actuator 17 in a run mode at lower voltage levels. When the voltage is below the level for the actuator to operate, the AC-detect circuit 13 keeps the actuator 17 in the run mode upon a power return thereby preventing it from latching prematurely into a hold position. Once the voltage reaches a certain level, the actuator or motor 17 begins to turn the damper 18. For an intermediate voltage, both the AC-detect circuit 13 and the reset circuit 53 keep the actuator 17 in a run mode. As the voltage to the actuator 17 continues to increase, the AC-detect circuit 13 cuts out of the system control circuit, allowing the circuit to latch into the hold state once the actuator drives the damper 18 to its fully open position. The period of energy dissipation of the system circuit may be extended in time with a more substantially sized capacitor across the system circuit power supply terminals 51 and 47.

Figure 6A:
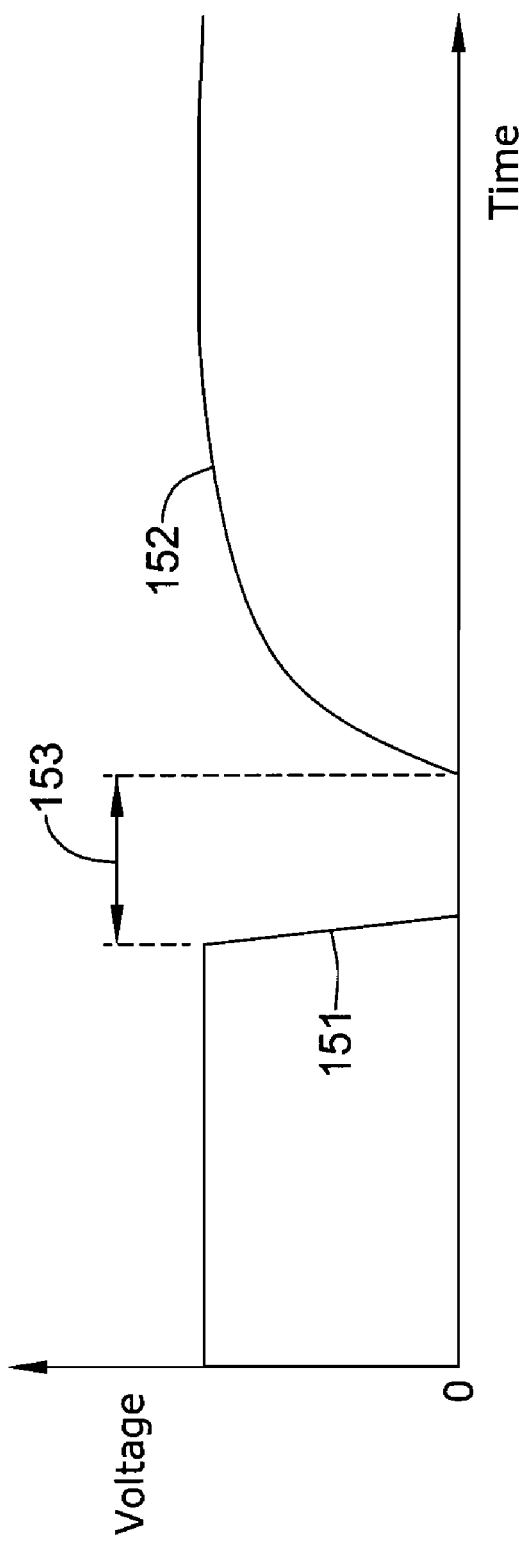
FIG. 6a is a graph of the voltage on the capacitor of the reset circuit.
Figure 11:
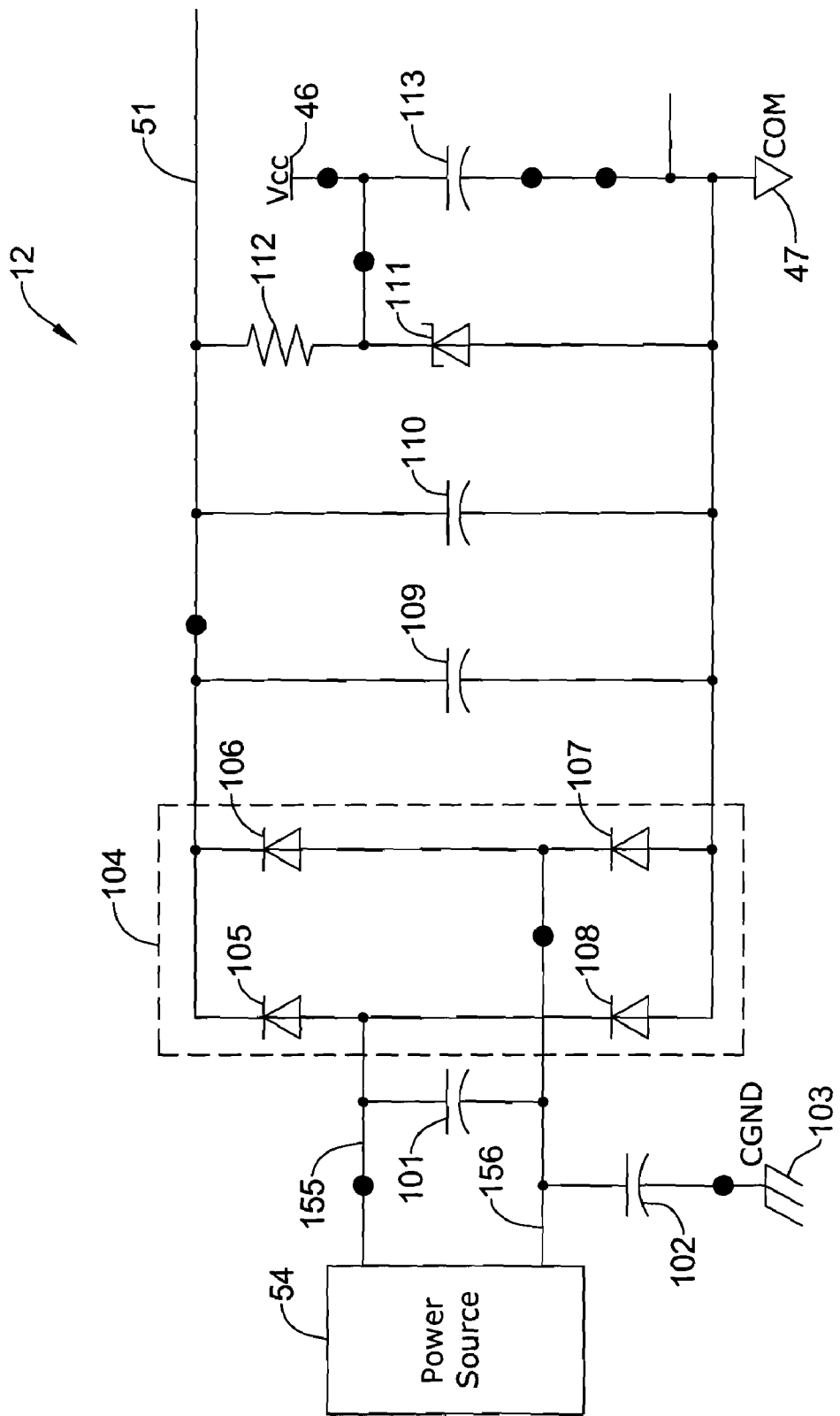
FIG. 11 is a schematic of power supply circuitry.

The slow voltage rise, voltage change or AC detect circuit 13 and reset circuit 53 may consist of an op-amp used as a comparator 31, an inverter 32, six resistors 33, 34, 35, 36, 37 and 38, and a ten microfarad capacitor 39 feeding via the inverter 32 into the R input 14 of an RS-latch 40 (FIG. 6). Latch 40 may have two NOR gates 41 and 42 interconnected in a latch-like fashion (i.e., the output of each gate connected to an input of the other gate). Upon a loss of power, the voltage across a resistor divider of resistors 33 and 34 may decrease. Resistors 33 and 34 may be 100K ohms and 15K ohms, respectively. Resistor 33 has one end connected to one end of resistor 34, and another end connected to an output line 51 of the power supply circuit 12 for the system (FIG. 11). The other end of resistor 34 may be connected to ground 47. The voltage at the common connection of resistors 33 and 34 may be fed into the non-inverting terminal 44 of the comparator 31. The voltage at terminal 44 may hit or go below a certain predetermined level, which is the level of the voltage at the inverting terminal 45 of the comparator 31. The voltage at the inverting terminal 45 may be provided by a voltage divider of resistors 35 and 36 connected in series across Vcc 46 and ground 47. Resistors 35 and 36 may each be 10K ohms. The voltage at the inverting terminal 45 may be relatively fixed. Since it has a smaller rail, input 45 reaches its fixed voltage before the non-inverting input 44 reaches its voltage. FIG. 6a shows the voltage on capacitor 39 versus time. When a voltage at the non-inverting input 44 is the same or less than the voltage at the inverting input 45, then a comparator 31 output 43 may have a low impedance and thus rapidly discharge the capacitor 39 (as shown by curve 151 in FIG. 6a) to provide a logic 0 via a 909 ohm resistor 37 at one end of capacitor 39 to the input of inverter 32. The other end of capacitor 39 may be connected to ground 47. Inverter 32 may have an output 14 that provides a logic one to the R input 14 of latch 40.

Dimension 153 of FIG. 6a represents the period of disruption of power to the system. Once power is restored to the system, the voltage across a divider having resistors 33 and 34 may increase and be present at the non-inverting input 44. This voltage may eventually become higher than the voltage at the inverting terminal 45, which results in an open-collector output 43 at the comparator 31. Output 43 then presents a high impedance and does not affect the charge on the capacitor 39. Capacitor 39 may be charged up by current through a 100K ohm resistor 38 from Vcc 46 (as shown by curve 152 in FIG. 6a). But before capacitor 39 is charged and Vcc 46 is on or up to its normal voltage, the input to inverter 32 is low and the inverter's output to the R input is a logic high or one. Then the output 48 of latch 40 would be a logic low or zero indicating a run mode. The RC time constant of resistor 38 and capacitor 39 provides an appropriate amount of time due to charging so that the actuator 17 may be in the run mode for that period of time which is until the actuator reaches the end of the stroke and before a logic zero is fed from inverter 32 to the R input 14.

FIG. 4 shows a truth table of the RS latch 40 for the R input 14, the S input 15 and the Q output 48. The row where R=1 and S=0, Q is 0 for a drive at start-up. The row where R=0 and S=0, Q is Q in that Q=Q'=0 for a drive. The row where R=0 and S=1, Q is 1 for a hold. The row where R=1 and S=1, Q is 0 for a drive.

Figure 7:
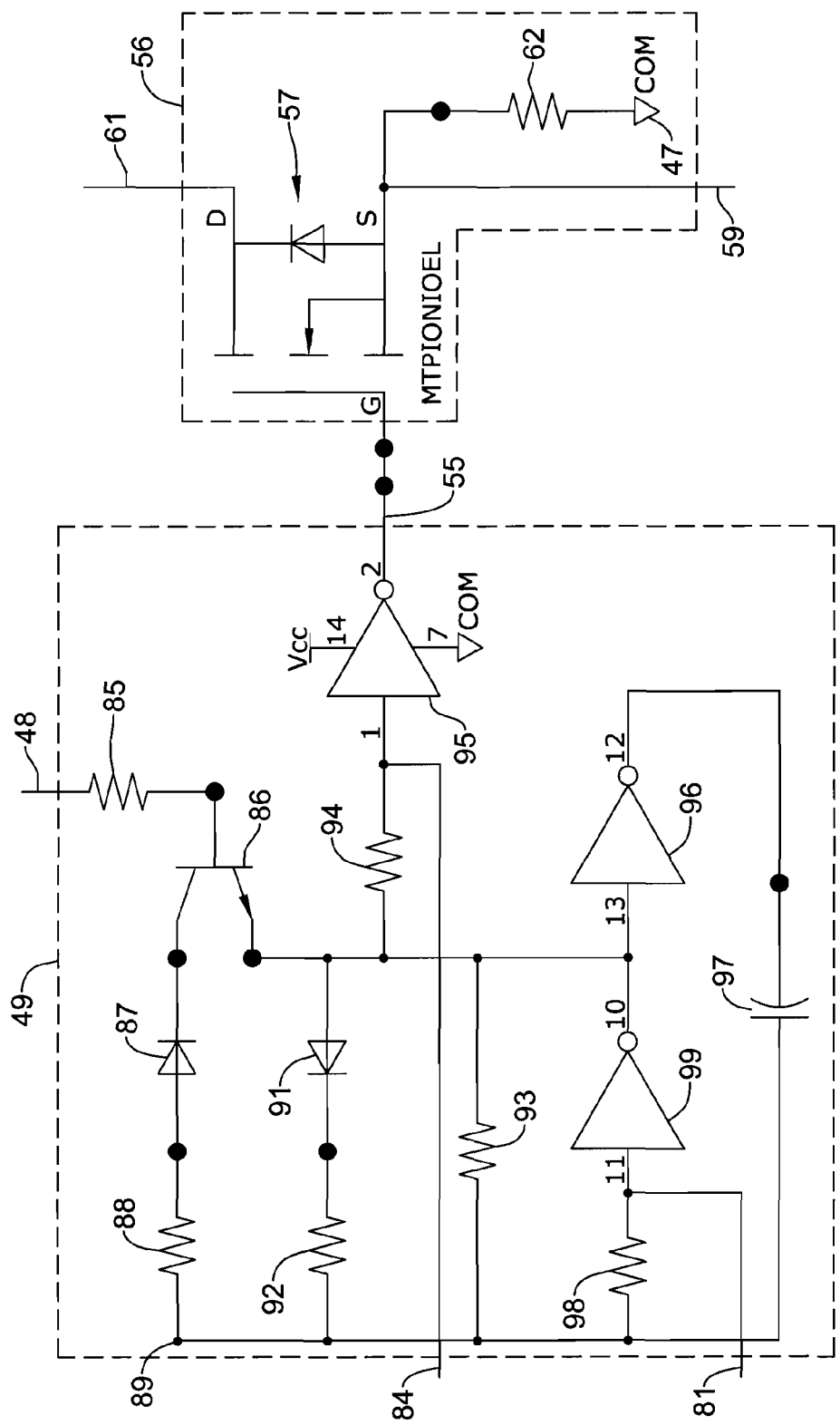
FIG. 7 is a schematic of an oscillator and actuator control device.

FIG. 7 shows an oscillator and associated circuitry 49. The oscillator 49 may have an output 55 that proceeds to a motor or actuator control device or module 56 that is connected via line 61 to one side of the actuator 17 where it is connected to a ground 47 with the FET switch 57. The ground 47 connection may have a 0.33 ohm resistor 62 for current sensing. The other end of the resistor 62, connected to the source of FET 57, may be connected to a current sensor 58 (FIG. 9) via a line 59. Output 55 is connected to the gate of FET 57. The drain of the FET is connected to the actuator 17 via a line 61. Signals such as the 60 percent duty cycle signal 24 and the 20 percent duty cycle signal 25 may be applied from oscillator output 55 to actuator 17 via module 56.

Figure 8:
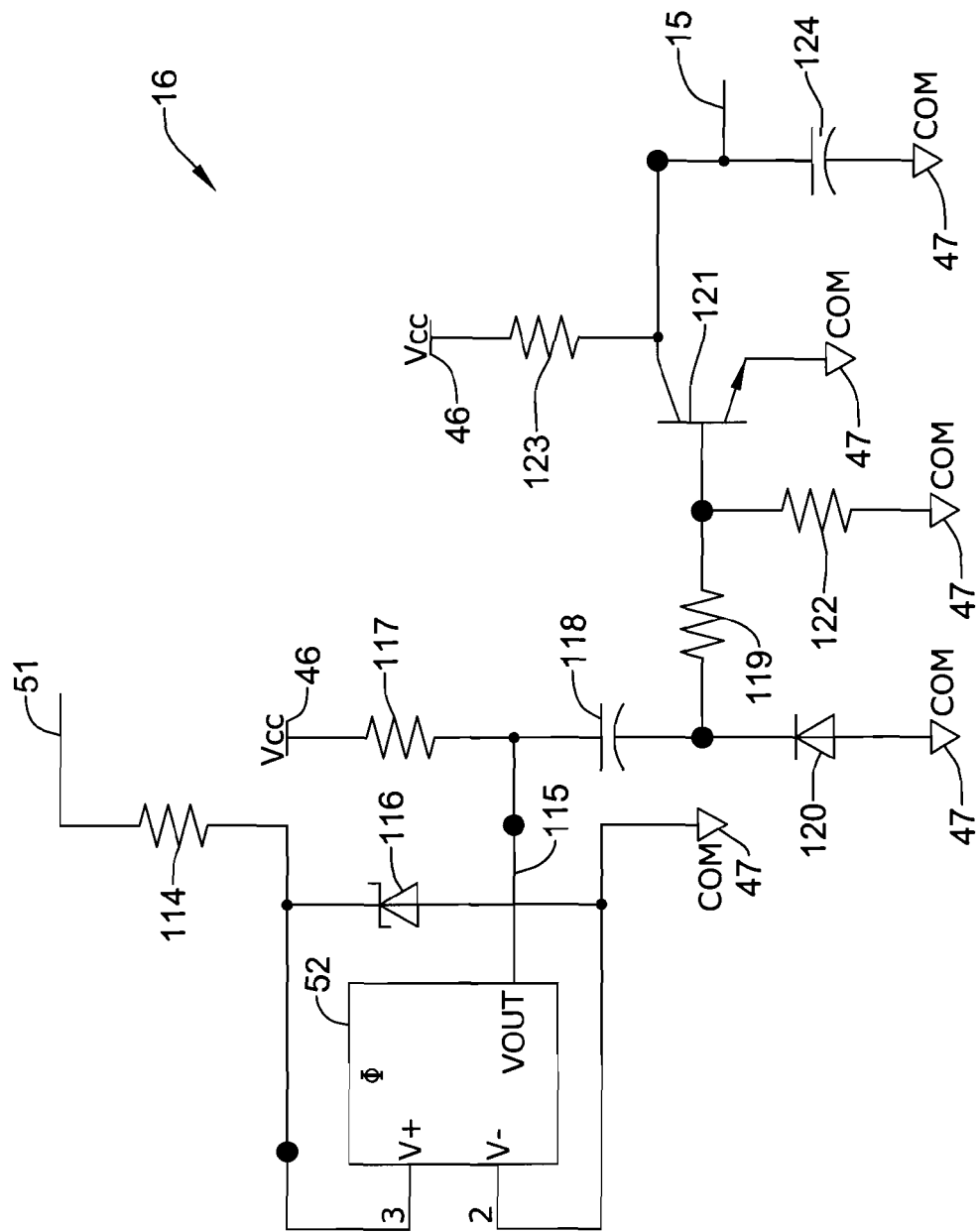
FIG. 8 is a schematic of a motion sensor and related circuitry.

FIG. 8 shows a schematic of a module 16 with a motion or actuation sensor 52 and related circuitry. Sensor 52 may be a Hall effect sensor model SS443A by Honeywell International Inc. Power may be applied to the sensor 52 via line 51 from module 12 (FIG. 11). An output from the actuation sensor module 16 may be connected via a line 15 to the S input of NOR gate 42 of latch 40 (FIG. 6).

For further detail of actuation sensor module 16 in FIG. 8, line 51 may provide power through a 909 ohm resistor 114 to the sensor 52. The sensor is also connected to ground 47. A zener diode (1N5254B) 116 may be connected across the power input terminals of sensor 52 with the anode to ground 47. A sensor signal output 115 may be connected to one end of a 10K ohm resistor 117 and one end of a 0.1 microfarad capacitor 118. The other end of capacitor 118 may be connected to one end of a 100K ohm resistor 119 and to a cathode of diode (1N4148) 120. The anode of diode 120 may be connected to ground 47. The other end of resistor 117 may be connected to Vcc 46. The other end of resistor 119 may be connected to a base of transistor 121 and to one end of a 100K ohm resistor 122. The other end of resistor 122 may be connected to ground 47. The collector of transistor 121 may be connected through a 150K ohm resistor 123 to Vcc 46. The collector of transistor 121 may also be connected to one end of a ten microfarad capacitor 124 and to line 15. The other end of capacitor 124 and the emitter of transistor 121 may be connected to ground 47.

Figure 9:
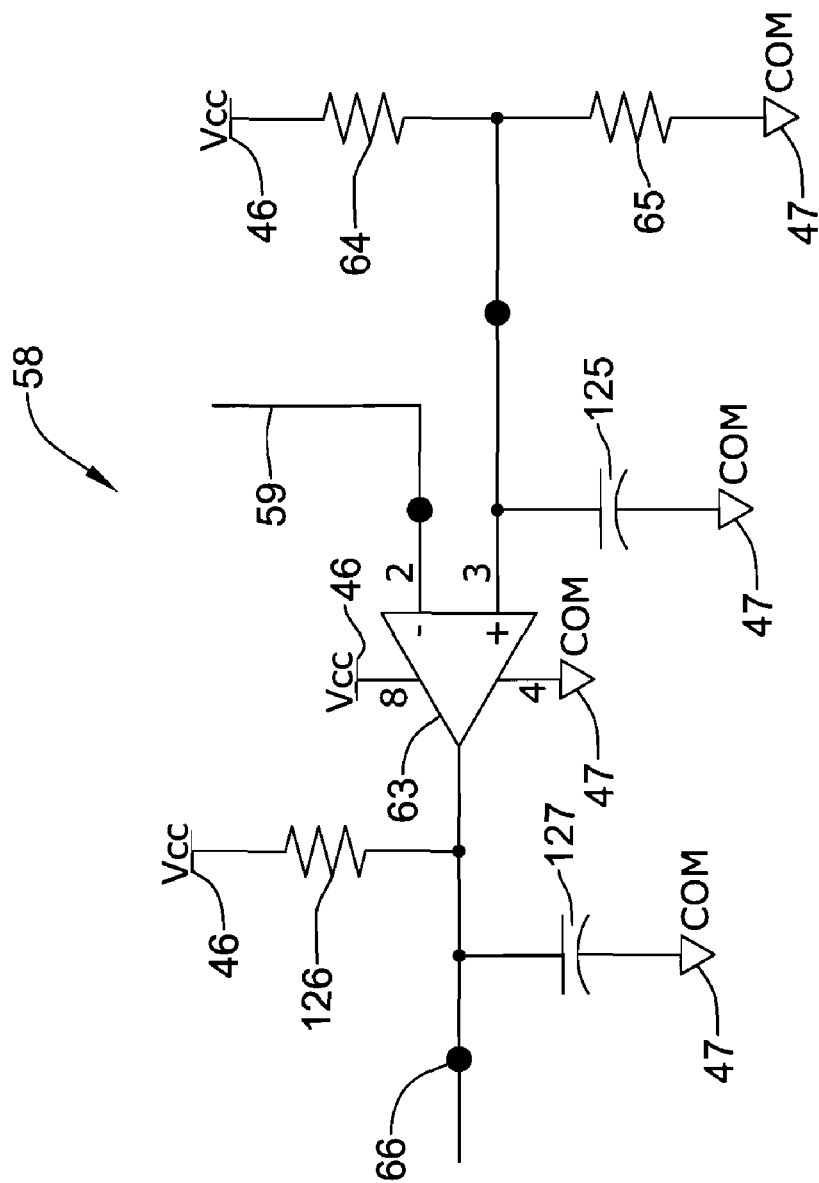
FIG. 9 is a schematic of a current overload detection circuit.

FIG. 9 is a diagram of the current sensor module 58 which may be presented with a voltage drop across resistor 62 of actuator control module 56 (FIG. 7) via line 59 to an inverting input of comparator 63. A voltage from the mid-point of a voltage divider with 10K and 976 ohm resistors 64 and 65, respectively, connected in series from Vcc 46 to ground 47, may be provided to a non-inverting input of comparator 63. If there is an amount of current through resistor 62 in module 56 that is determined to be excessive for the actuator 17, then the voltage drop to the inverting input of comparator 63, when compared to the voltage drop across resistor 65, may cause an output on line 66 to go from a logic high to a logic low indicating a current overload through actuator 17. Line 66 may be connected to an input of a NOR gate 67 in the temperature sensor module 68 of FIG. 10.

A ten microfarad capacitor 125 may be connected across the resistor 65. The output of comparator 63 may be connected through a 100K ohm resistor 126 to Vcc 46. Also, the output of comparator 63 may be connected through a 0.001 microfarad capacitor 127 to ground 47.

Figure 12:
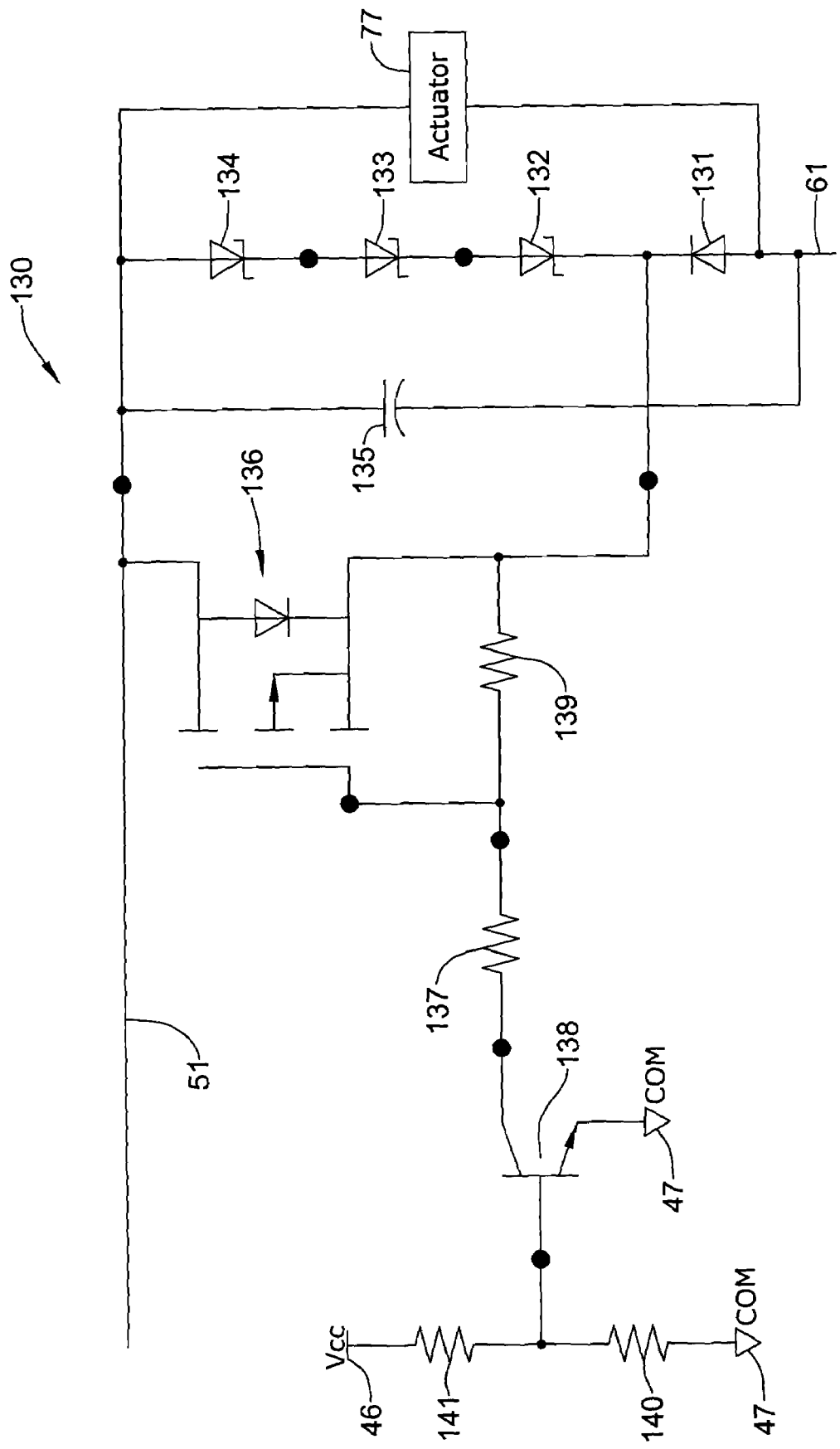
FIG. 12 is a schematic of motor interface circuitry.

FIG. 12 is a diagram of a circuit 130 for application with an actuator 17 which may generate back EMF when running backwards upon a deenergizing of the actuator. A power connection to actuator 17 may be lines 61 and 51. A 0.01 microfarad capacitor 135 may be connected across lines 51 and 61. The actuator 17 may for example be a brush D.C. motor that drives an actuable mechanism 18 (FIG. 1). Actuator 17 may be caused to run backwards by a spring on the actuator 17 or mechanism 18, and return it to its normal position during a deenergized state of the actuator. The circuit 130 may reduce the speed of the actuator 17 and mechanism 18 while returning to its normal position while in the deenergized state, with current returning through a diode 131, having a cathode connected to an anode of zener diode 132, and presenting a voltage across the zener diodes (1N5917B) 132, 133 and 134 which are connected in series with the anode of diode 134 connected to line 51 and the anode of diode 131 connected to line 61. Current may flow through a P-channel FET 136, which has a drain connected to line 51 and a source connected to the cathode of diode 131. The gate of transistor 136 may be connected through a 20K ohm resistor 137 to a collector of an NPN transistor 138. The gate of transistor 136 may also be connected through a 10K ohm resistor 139 to the cathode of diode 131. The emitter of transistor 138 may be connected to the ground 47. The base of transistor 138 may be connected through a 40.2K ohm resistor 141 to Vcc 46, and the base may also be connected through a 10K ohm resistor 140 to ground 47.

Figure 10:
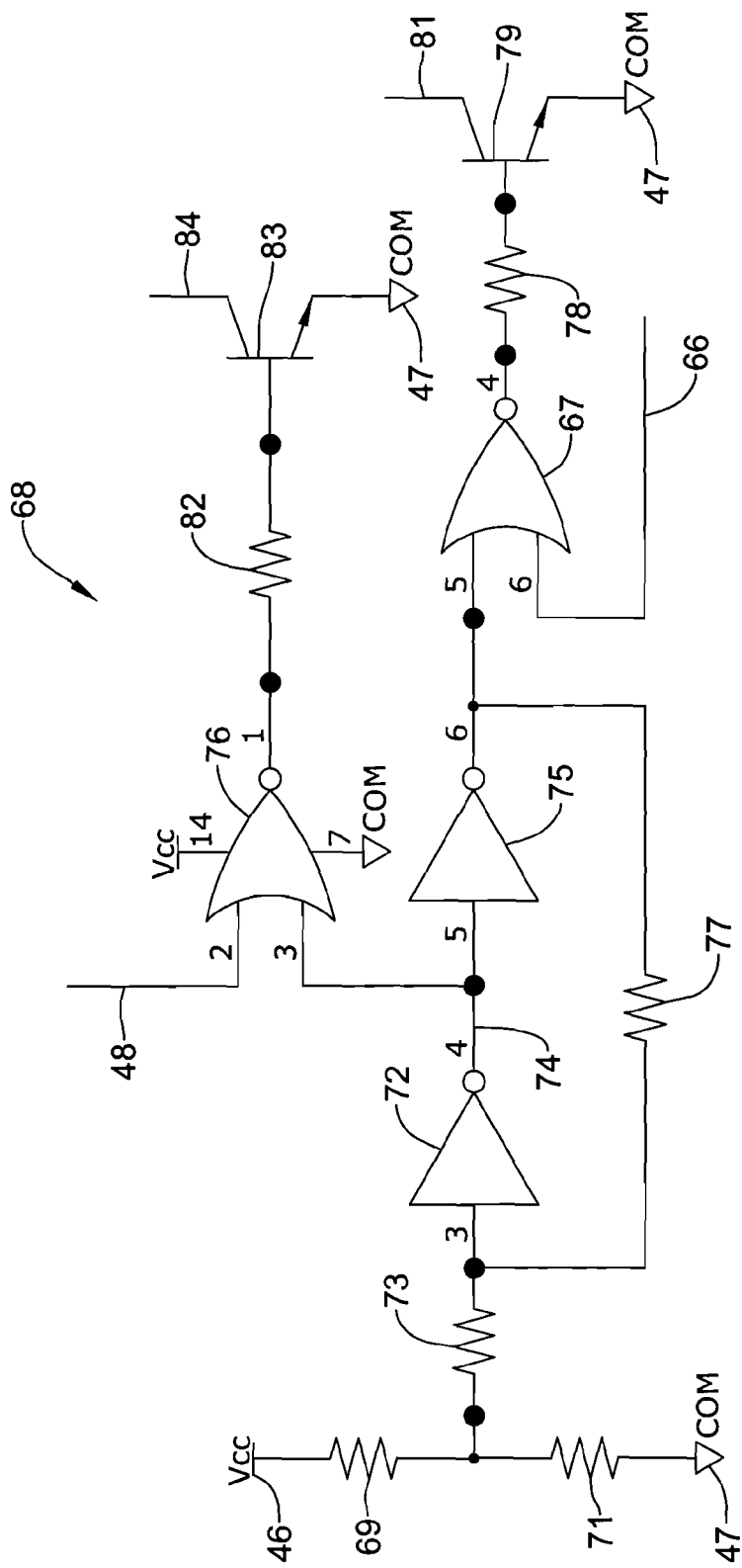
FIG. 10 is a schematic of a high temperature detection circuit.

FIG. 10 shows a temperature sensitive resistor 69 that may change in resistance relative to temperature variation. Resistor 69 may be proximate to the actuator 17 for purposes of detecting an overheating situation within the actuator. The resistor 69 may be a part of a voltage divider with resistor 69 connected to Vcc 46 and a resistor 71 connected to ground 47. The midpoint or connection of resistors 69 and 71 may be connected to an input of an inverter 72 via a 10K ohm resistor 73. Resistors 69 and 71 may have nominal values of 47K and 3.740K ohms, respectively. An output from inverter 72 may go via a line 74 to an input of an inverter 75 and an input of a NOR gate 76. An output of inverter 75 may be connected through a 100K ohm resistor 77 to the input of inverter 72. The output of inverter 75 may also be connected to an input of NOR gate 67.

An output of NOR gate 67 may be connected via a 100K ohm resistor 78 to a base of an NPN transistor 79. The emitter of transistor 79 may be connected to ground 47 and the collector may be connected via a line 81 to oscillator module 49 (FIG. 7). The output 48 of latch 40 (FIG. 6) may be connected to an input of NOR gate 76. An output of gate 76 may go via a 100K ohm resistor 82 to a base of an NPN transistor 83. The emitter of transistor 83 may be connected to ground 47 and the collector may be connected via a line 84 to the oscillator module 49 of FIG. 7.

The output 48 from the latch 40 (FIG. 6) may be connected through a 10K ohm resistor 85 to a base of an NPN transistor 86 (FIG. 7). The collector of transistor 86 may be connected to a cathode of a diode 87, and the anode of the diode 87 may be connected through a 6.040K ohm resistor 88 to a terminal 89. The emitter of transistor 86 may be connected to an anode of a diode 91. The cathode of diode 91 may be connected through a 43.2K ohm resistor 92 to the terminal 89. The emitter of transistor 86 may be connected through a 130K ohm resistor 93 to the terminal 89. The emitter of transistor 86 may also be connected through a 10K ohm resistor 94 to an input of an inverter 95. Line 84 from the collector of transistor 83 in FIG. 10 may be connected to the input of inverter 95. The output 55 of inverter 95 and of the oscillator 49 may be connected to the gate of FET 57. The emitter of transistor 86 may also be connected to an input of an inverter 96. The output of inverter 96 may be connected to one end of a 0.001 microfarad capacitor 97. The other end of capacitor 97 may be connected to terminal 89. Terminal 89 may be connected through a 10K resistor 98 to an input of an inverter 99. Also, line 81 from the collector of transistor 79 (FIG. 10) may be connected to the input of inverter 99. The output of inverter 99 is connected to the input of inverter 96.

FIG. 11 is a diagram of the rectifier, filter and regulator module 12. A power source module 54 may provide a 24 volt AC supply via lines 155 and 156 to module 12. A 0.10 microfarad capacitor 101 may be connected across lines 155 and 156. Another 0.10 microfarad capacitor 102 may be connected between line 156 and a ground 103. Ground 103 is different from and isolated from the ground 47 of the system. The power on lines 155 and 156 may go through a full-wave rectifier 104. Diode 105 may have a cathode connected to a cathode of a diode 106. Diode 106 may have an anode connected to a cathode of diode 107. Diode 107 may have an anode connected to an anode of diode 108. The cathode of diode 105 and the anode of diode 108 may be connected to line 155. The anode of diode 106 and the cathode of 107 may be connected to line 156. The cathodes of diodes 105 and 106 may be connected to line 51. The anodes of diodes 107 and 108 may be connected to ground 47. Thus, a full-wave rectification of the voltage signal from the source 54 may be present across line 51 and ground 47. Various other approaches, such as other rectification or direct current schemes, with other kinds of components, half-wave, or just a plain DC voltage from the power source module 54, may be utilized for providing the power to lines 51 and 47. A 1000 microfarad capacitor 109 and a 0.1 microfarad capacitor 110 may be connected across the power output line or terminal 51 and ground 47. Capacitors 109 and 110 may provide filtering for the output from rectifier 104. Capacitor 109 may provide some sustaining reserve power for a brief period of time to system 10 upon a disruption of power to the system. About a 5.1 volt zener diode 111 may have an anode connected to ground 47 and a cathode connected through a 2K ohm resistor 112 to line 51. A 0.1 microfarad capacitor 113 may be connected across the zener diode 111. The connection between the cathode of diode 111 and resistor 112 may be the Vcc supply terminal 46. The five or so volts at terminal 46 may be regarded as regulated.

In the present specification, some of the matter may be of a hypothetical or prophetic nature although stated in another manner or tense.

Although the invention has been described with respect to at least one illustrative example, many variations and modifications will become apparent to those skilled in the art upon reading the present specification. It is therefore the intention that the appended claims be interpreted as broadly as possible in view of the prior art to include all such variations and modifications.

What is claimed is:

1. An actuator control system comprising:
an actuator; and
a control circuit connected to the actuator; and
wherein if a period of time between a removal of power and a return of power to the system is greater than or equal to about one millisecond, then the control circuit can activate the actuator to open a damper upon the return of power; and wherein the control circuit comprises:
a detect and reset circuit;
a latch connected to the detect and reset circuit; and
a driver connected to the latch.

2. The system of claim 1, wherein:
the detect and reset circuit comprises:
a comparator having first and second inputs, and an output; and
a latch setting circuit having an input connected to the output of the comparator and having an output connected to the latch; and
wherein:
the first input of the comparator is connected to a system power input voltage level indicator; and
the second input of the comparator is connected to an internal circuit power voltage level indicator.

3. The system of claim 2, wherein:
a period of time is provided after the return of power to the system for the control circuit to open the actuator;
the period of time is provided by delaying a voltage at the first input of the comparator from exceeding a voltage at the second input of the comparator to provide the run signal at the output of the comparator.

4. The system of claim 1, wherein:
the detect and reset circuit is for providing a run or hold set signal to the latch;
the latch is for providing a run or hold select signal to the driver; and
the driver is for providing a run or hold drive signal to the actuator.

5. The system of claim 4, wherein:
a run or hold set signal results in a run or hold select signal, respectively;
a run or hold select signal results in a run or hold drive signal, respectively;
the run drive signal opens the actuator; and
the hold signal holds the actuator in its position.

6. The system of claim 5, wherein:
the actuator is a motor;
the drive signal is a pulse width modulated (PWM) signal;
the PWM signal having a duty cycle greater than about forty percent is a drive signal; and
the PWM signal having a duty cycle less than about forty percent is a hold signal.

7. A method for recovery after a power disruption of a system for controlling an actuator, comprising:
providing a system for controlling an actuator;
detecting a loss of power from the system;
resetting a latch into a drive mode for driving an actuator to an open position before energy in the system dissipates below a predetermined level;
detecting a return of power to the system;
delaying putting the latch into a hold mode for a predetermined period of time after the return of power to the system; and
driving the actuator to the open position during the predetermined period of time while the latch is in the drive mode.

8. The method of claim 7, wherein:
detecting a loss of power from the system may be accomplished with a comparator having a non-inverting input connected to a system power input terminal, and an inverting input connected to a system power supply circuit output terminal, with a voltage level at the non-inverting input going below the voltage level at the inverting input, resulting in a low output from the comparator; and the low output from the comparator causes the latch to reset into the drive mode.

9. The method of claim 8, wherein:
detecting a return of power may be accomplished with a voltage level at the non-inverting input going above the voltage level at the inverting input, resulting in a high output from the comparator;
the high output from the comparator does not cause but permits the latch to go into a hold mode;
a capacitor upon being charged through a resistor connected to a system power supply circuit output terminal, causes the latch to go from the drive mode into the hold mode after the predetermined period of time has passed;
the predetermined period of time is proportionally determined by a time constant of the resistor and the capacitor.

10. The method of claim 9, wherein:
the drive mode is for driving the actuator to an open position; and
the hold mode is for holding the actuator at its position.

11. The method of claim 7, wherein a period of time between a moment of the detecting a loss of power from the system and a moment of detecting a return of power to the system ranges from about one millisecond to greater than five minutes.

12. A system for recovery after power disruption, comprising:
an actuator having a run mode;
a driver connected to the actuator;
a latch connected to the driver;
a voltage change detect and reset circuit connected to the latch; and
wherein upon a power loss from the system, the voltage change detect and reset circuit resets the latch to put the actuator into the run mode, before residual power in the system is gone.

13. The system of claim 12, wherein the voltage change detect and reset circuit, upon a detection of a power loss from the system, resets the latch to put the actuator in the run mode.

14. The system of claim 13, wherein, upon a power return to the system, the voltage change detect and reset circuit maintains the latch reset to retain the actuator in the run mode.

15. The system of claim 14, wherein, as the voltage of the power return increases, the voltage change detect and reset circuit disconnects from the system thereby allowing the latch to go into the hold mode when the actuator is at a fully open position.

16. The system of claim 15, wherein:
the voltage change detect and reset circuit comprises:
a voltage divider connected across a system power terminal and ground;
a comparator having a first input connected to the voltage divider, having a second input connected to a voltage level and having an output;
a resistor having a first end connected to an internal supply voltage; and
a capacitor having a first end connected to a second end of the resistor and the output of the comparator, and a second end connected to ground; and
the latch has an input connected to the first end of the capacitor, and an output for providing a run mode or a hold mode signal.

17. The system of claim 16, wherein:
upon a power loss, a voltage level across the voltage divider decreases and at the first input to the comparator meets or goes below the voltage level at the second input of the comparator, a discharge of the capacitor occurs at the output of the comparator; and
the resulting low voltage output of the comparator goes to the input of the latch having an output for providing a run mode signal.

18. The system of claim 17, wherein:
upon a power return, the voltage level of the voltage divider increases at the first input of the comparator and exceeds the voltage level at the second input of the comparator, which results in an effective open at the output of the comparator;
the voltage level at the output of the comparator increases as the capacitor charges up with current through the resistor having the first end connected to the internal supply voltage;
when the voltage level at the output of the comparator is below a threshold level, the output of the latch provides a run mode signal; and
as the voltage level at the output of the comparator reaches the threshold level after a period of time starting at the power return and ending when the actuator is at a fully open position.

19. The system of claim 18, wherein the period of time is determined at least partially by a time constant of the capacitor and the resistor.

* * * * *